United States Patent
Lee (10) Patent No.: US 12,525,812 B2
(45) Date of Patent: Jan. 13, 2026

(54) BATTERY DISTRIBUTING APPARATUS

(71) Applicant: LG ENERGY SOLUTION, LTD., Seoul (KR)

(72) Inventor: Sung-Gun Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 599 days.

(21) Appl. No.: 17/927,287

(22) PCT Filed: Sep. 10, 2021

(86) PCT No.: PCT/KR2021/012380
§ 371 (c)(1),
(2) Date: Nov. 22, 2022

(87) PCT Pub. No.: WO2022/092553
PCT Pub. Date: May 5, 2022

(65) Prior Publication Data
US 2023/0216319 A1    Jul. 6, 2023

(30) Foreign Application Priority Data
Oct. 27, 2020 (KR) .................. 10-2020-0140710

(51) Int. Cl.
*H02J 7/00* (2006.01)
*G01R 31/392* (2019.01)
*G06Q 30/0601* (2023.01)

(52) U.S. Cl.
CPC .......... *H02J 7/0048* (2020.01); *G01R 31/392* (2019.01); *G06Q 30/0631* (2013.01); *H02J 7/00032* (2020.01); *H02J 7/005* (2020.01)

(58) Field of Classification Search
USPC ....... 320/132, 133, 134, 135, 136, 137, 138, 320/139
See application file for complete search history.

(56) References Cited

U.S. PATENT DOCUMENTS

| 8,831,822 B2 | 9/2014 | Iguchi |
| 2004/0113588 A1 | 6/2004 | Mikuriya et al. |

(Continued)

FOREIGN PATENT DOCUMENTS

| CN | 107215228 A | 9/2017 |
| EP | 3 506 454 A1 | 7/2019 |

(Continued)

OTHER PUBLICATIONS

International Search Report (PCT/ISA/210) issued in PCT/KR2021/012380 mailed on Dec. 23, 2021.

(Continued)

*Primary Examiner* — Brian Ngo
(74) *Attorney, Agent, or Firm* — Birch, Stewart, Kolasch & Birch, LLP (57) ABSTRACT

Disclosed is a battery distributing apparatus for efficiently using and distributing a plurality of exchange-type batteries. The battery distributing apparatus includes a battery determining module for determining a level of each battery for a plurality of batteries; a user determining module for determining a grade of each user who uses at least one battery among the plurality of batteries; and a selecting module for selecting a battery suitable for a requester who requests to use at least one battery among the plurality of batteries, based on the grade of the user determined by the user determining module and the level of the battery determined by the battery determining module.

14 Claims, 3 Drawing Sheets

(56) References Cited

U.S. PATENT DOCUMENTS

| | | | |
|---|---|---|---|
| 2019/0011505 A1* | 1/2019 | Park | H01M 10/42 |
| 2019/0207268 A1 | 7/2019 | Lai et al. | |
| 2019/0207397 A1 | 7/2019 | Lai et al. | |
| 2019/0213809 A1 | 7/2019 | Luke et al. | |
| 2019/0381911 A1 | 12/2019 | Shiiyama et al. | |

FOREIGN PATENT DOCUMENTS

| | | |
|---|---|---|
| JP | 4033130 B2 | 1/2008 |
| JP | 2010-172122 A | 8/2010 |
| JP | 2014-11060 A | 1/2014 |
| JP | 2014-531699 A | 11/2014 |
| JP | 2016-170600 A | 9/2016 |
| JP | 2016-171661 A | 9/2016 |
| JP | 6010619 B2 | 10/2016 |
| JP | 2017-134451 A | 8/2017 |
| JP | 2018-163385 A | 10/2018 |
| JP | 2019-122253 A | 7/2019 |
| JP | 6730643 B2 | 7/2020 |
| KR | 10-2019-0082135 A | 7/2019 |
| KR | 10-2019-0139026 A | 12/2019 |
| WO | WO 2011/077780 A1 | 6/2011 |
| WO | WO 2013/080211 A1 | 6/2013 |

OTHER PUBLICATIONS

Supplementary European Search Report for European Application No. 21866549.1, dated Feb. 21, 2024.

* cited by examiner

| BATTERY | B1 | B2 | B3 | B4 | B5 | B6 | B7 | B8 | B9 | B10 |
|---------|----|----|----|----|----|----|----|----|----|-----|
| LEVEL   | 7  | 2  | 6  | 9  | 8  | 10 | 5  | 1  | 4  | 3   |

| USER | U1 | U2 | U3 | U4 | U5 | U6 |
|---|---|---|---|---|---|---|
| GRADE | 6 | 4 | 1 | 5 | 2 | 3 |

FIG. 6

| USER GRADE | USER |
|---|---|
| 1.0 | U3, U15 |
| 0.9 | U4, U11 |
| 0.8 | U5, U9, U17 |
| 0.7 | U7, U16 |
| 0.6 | U2, U18 |
| 0.5 | U6, U19, U20 |
| 0.4 | U1, U12 |
| 0.3 | U8, U13 |
| 0.2 | U10 |
| 0.1 | U14 |

FIG. 7

| BATTERY LEVEL | BATTERY |
|---|---|
| 1.0 | B5 |
| 0.9 | B7, B9 |
| 0.8 | B1, B13 |
| 0.7 | B7, B14 |
| 0.6 | B4 |
| 0.5 | B10, B11 |
| 0.4 | B2, B15 |
| 0.3 | B3 |
| 0.2 | B6 |
| 0.1 | B12 |

FIG. 8

| TIME | WEIGHT PER TIME ZONE |
|---|---|
| 0 0'CLOCK ~ 1 0'CLOCK | 1.2 |
| 1 0'CLOCK ~ 11 0'CLOCK | 0.8 |
| 11 0'CLOCK ~ 14 0'CLOCK | 1.2 |
| 14 0'CLOCK ~ 17 0'CLOCK | 1.0 |
| 17 0'CLOCK ~ 21 0'CLOCK | 1.2 |
| 21 0'CLOCK ~ 22 0'CLOCK | 0.8 |
| 22 0'CLOCK ~ 24 0'CLOCK | 1.2 |

BATTERY DISTRIBUTING APPARATUS

TECHNICAL FIELD

The present application claims priority to Korean Patent Application No. 10-2020-0140710 filed on Oct. 27, 2020 in the Republic of Korea, the disclosures of which are incorporated herein by reference.

The present disclosure relates to a battery distribution technology, and more particularly, to a technology for distributing and providing an appropriate battery according to a user among a plurality of batteries.

BACKGROUND ART

Currently commercialized secondary batteries include nickel-cadmium batteries, nickel-hydrogen batteries, nickel-zinc batteries, lithium secondary batteries, and the like. Among them, the lithium secondary batteries are spotlighted because they ensure free charging and discharging due to substantially no memory effect compared to nickel-based secondary batteries, as well as very low discharge rate and high energy density.

The lithium secondary battery mainly uses lithium-based oxide and carbon material as positive electrode active material and negative electrode active material, respectively. The lithium secondary battery includes an electrode assembly in which a positive electrode plate and a negative electrode plate respectively coated with a positive electrode active material and a negative electrode active material are arranged with a separator interposed therebetween, and an exterior, namely a battery case, for hermetically receiving the electrode assembly together with electrolyte.

In general, a lithium secondary battery may be classified into a can-type secondary battery in which an electrode assembly is included in a metal can and a pouch-type secondary battery in which an electrode assembly is included in a pouch made of an aluminum laminate sheet, depending on the shape of the exterior.

Batteries have been widely used to supply an operating power to portable terminals such as smartphones and laptop computers for several decades. Recently, as the development and dissemination of electric vehicles expand, the battery is recognized as a very important component as a driving energy source that enables the electric vehicle to move. A battery pack for such an electric vehicle may be configured to be attachable to and detachable from the vehicle. In particular, with the recent activation of shared e-mobility business, interest in exchange-type batteries that can be shared is increasing.

The exchange-type battery may be provided to a user at a specific place such as a battery charging station. That is, the battery charging station or the like is equipped with a plurality of batteries in a charged state, and the charged batteries may be provided to a user when the user requests the same. For example, when the battery is near a fully-discharged state while the electric vehicle is running, the driver may stop by the battery charging station to request the battery, and receive a fully charged battery to exchange the battery of the electric vehicle.

However, when distributing exchange-type batteries to users at the battery charging station, until now, only the state of charge (SOC) of the exchange-type batteries is considered, and in most cases, batteries are distributed randomly without considering other factors as a whole.

In particular, a plurality of batteries provided in the battery charging station may have different overall degradation levels, for example, state of health (SOH). In addition, the degree of degradation of the battery may be different depending on who uses the battery and how the battery is used, namely depending on the use environment or use type. For example, a user who uses a battery harshly may cause more serious battery degradation while using the battery.

In addition, due to the difference in the SOH of each battery or the characteristics of each user, a specific battery may be degraded more rapidly. Therefore, in this case, the difference in the degree of degradation for the plurality of batteries provided in the battery charging station may be further increased, which may change the lifespans of the batteries. Therefore, since a battery that is degraded frequently needs to be replaced, at the charging station, the battery replacement cycle becomes faster. Therefore, in this case, at the charging station, the management cost of the batteries may be increased. In addition, the user who receives a battery may receive the battery that has been degraded frequently regardless of his/her use pattern, so the user may feel uncomfortable in using the battery due to frequent charging and discharging. In addition, this may bring about a problem of lowering the reliability of the battery charging station.

DISCLOSURE

Technical Problem

The present disclosure is designed to solve the problems of the related art, and therefore the present disclosure is directed to providing a battery distributing apparatus, which enables a plurality of exchange-type batteries to be efficiently used and distributed.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery distributing apparatus, comprising: a battery determining module configured to determine a level of each battery for among a plurality of batteries; a user determining module configured to determine a grade of each user who uses at least one battery among the plurality of batteries; and a selecting module configured to select a battery suitable for the user who requests to use the at least one battery among the plurality of batteries, based on the grade of the user determined by the user determining module and the level of the battery determined by the battery determining module.

Here, the battery determining module may be configured to determine the level of each battery based on a state of health (SOH) of each battery.

In addition, the user determining module may be configured to determine the grade of each user based on a battery use history.

In addition, the battery distributing apparatus according to the present disclosure may further comprise a battery information collecting module configured to receive information about the battery use history of each user from the at least one battery and transmit the received information to the user determining module.

In addition, the user determining module may be configured to use an instantaneous discharge current of each battery as the battery use history.

In addition, the user determining module may be configured to use a lowest state of charge (SOC) of each of the battery as the battery use history.

In addition, the user determining module may be configured to use a charging environment of each battery as the battery use history.

In addition, the charging environment of the battery may include a charging C-rate of each battery.

In addition, the charging environment of the battery may include a maximum charging state of charge (SOC) of each battery.

In addition, the selecting module may be configured to select a suitable battery among the plurality of batteries in consideration of a battery use request time point of the user requesting to use the at least one battery.

In another aspect of the present disclosure, there is also provided a battery charging system, comprising the battery distributing apparatus according to the present disclosure.

Advantageous Effects

According to the present disclosure, a plurality of exchange-type batteries may be efficiently distributed.

In particular, according to an embodiment of the present disclosure, by matching the level of the battery with the grade of the user, a battery suitable for the user may be provided, so that the degree of degradation may be uniform for all batteries.

Moreover, according to an embodiment of the present disclosure, it is possible to prevent a specific battery from being rapidly degraded compared to other batteries among a plurality of shared exchange-type batteries. That is, in this case, the lifespan of the battery may be further improved.

Therefore, according to this embodiment of the present disclosure, by increasing the replacement cycle for all batteries, it is possible to reduce the battery management cost.

Moreover, the present disclosure may be more effectively utilized in a place or business in which a plurality of shared exchange-type batteries are rented or sold to the public, such as a battery charging station.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
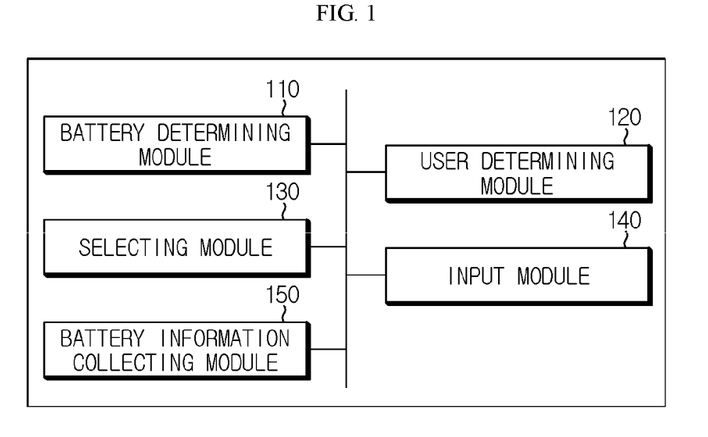
FIG. 1 is a block diagram schematically showing a functional configuration of a battery distributing apparatus according to an embodiment of the present disclosure.

FIG. 1 is a block diagram schematically showing a functional configuration of a battery distributing apparatus according to an embodiment of the present disclosure.

Referring to FIG. 1, the battery distributing apparatus according to the present disclosure may include a battery determining module 110, a user determining module 120 and a selecting module 130.

The battery determining module 110 may be configured to determine the level of each battery for a plurality of batteries. This will be described in more detail with reference to FIG. 2.

Figure 2:
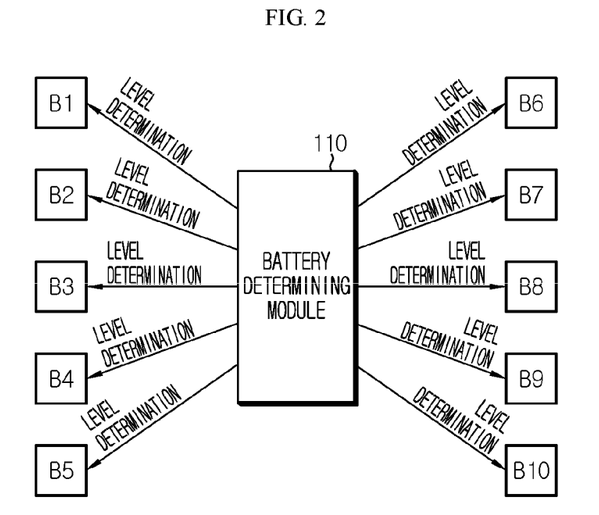
FIG. 2 is a diagram schematically showing an operating configuration of a battery determining module according to an embodiment of the present disclosure.

FIG. 2 is a diagram schematically showing an operating configuration of the battery determining module 110 according to an embodiment of the present disclosure.

Referring to FIG. 2, the battery determining module 110 may determine the level of each battery for a plurality of batteries, namely 10 batteries. Here, the battery may be a battery pack or a battery module including a plurality of secondary batteries, or a battery cell including one secondary battery. In particular, the battery may be a battery pack for an electric vehicle. Also, the plurality of batteries may be exchange-type batteries. For example, a battery charging station may be equipped with a plurality of exchange-type batteries such that the plurality of exchange-type batteries are used in a shared form by a plurality of users. In particular, the exchange-type battery may be a battery used for a service that receives a discharged or damaged battery from a user and provides a charged or normal battery. As shown in FIG. 2, if ten exchange-type batteries are provided, the battery determining module 110 may determine the level of each battery for the ten batteries.

Here, the battery determining module 110 may indicate a state level of each battery in various ways. For example, the battery determining module 110 may classify the battery level into 10 levels from Level 1 to Level 10, and determine a level corresponding to each battery. Meanwhile, the level of each battery may be a state level indicating the state of each battery.

Figure 3:
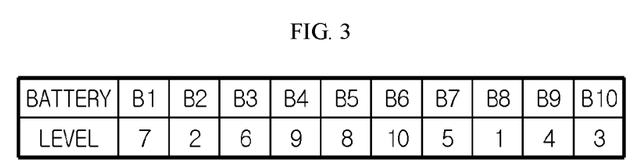
FIG. 3 is a table showing an example of levels for a plurality of batteries, determined by the battery determining module according to an embodiment of the present disclosure.

FIG. 3 is a table showing an example of levels for a plurality of batteries, determined by the battery determining module 110 according to an embodiment of the present disclosure.

Referring to FIG. 3, for a plurality of batteries B1 to B10, each battery has levels from 1 to 10. The level of each battery may be determined by the battery determining module 110. For example, by the battery determining module 110, the level of the battery B1 may be determined as 7, and the level of the battery B2 may be determined as 2. Also, by the battery determining module 110, the level of the battery B3 may be determined as 6, and the level of the battery B4 may be determined as 9. In this way, the battery determining module 110 may determine the level for all of ten batteries.

Meanwhile, as shown in FIG. 3, the battery determining module 110 may determine the level differently for a plurality of batteries. In this case, since batteries have different levels, the selecting module 130 may select a battery more easily. However, the present disclosure is not necessarily limited thereto, and at least for some batteries, the level may be determined to be the same.

When the battery determining module 110 determines the level of each battery, the determined result may be stored in an internal memory included therein or a separate storage module or server provided externally.

The user determining module 120 may be configured to determine the grade of a user. In particular, the user determining module 120 may be configured to determine the grade of a user who uses at least one battery among the plurality of batteries.

Figure 4:
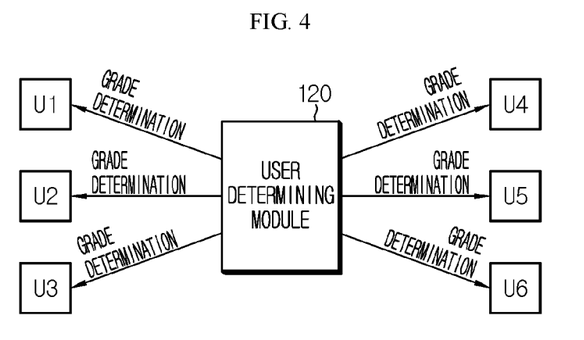
FIG. 4 is a diagram schematically showing an operating configuration of a user determining module according to an embodiment of the present disclosure.

FIG. 4 is a diagram schematically showing an operating configuration of the user determining module 120 according to an embodiment of the present disclosure.

First, referring to FIG. 4, there are 6 users U1 to U6, and the user determining module 120 may determine the grade for each user. Here, the user may be a subject who has used at least one battery among a plurality of batteries, for example the batteries B1 to B10 of FIGS. 2 to 3 above.

Moreover, a user whose user grade is determined by the user determining module 120 may be a user who has used a battery whose state level is determined by the battery determining module 110. For example, when the user U1 uses the battery B1 and the user U2 uses the battery B2, the user determining module 120 may determine the grade for each user who uses the batteries B1 and B2, namely each of the users U1 and U2.

Figure 5:
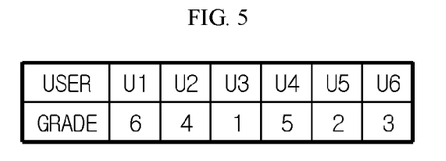
FIG. 5 is a table showing an example of grades for a user, determined by the user determining module according to an embodiment of the present disclosure.

FIG. 5 is a table showing an example of grades for a user, determined by the user determining module 120 according to an embodiment of the present disclosure.

Referring to FIG. 5, for the plurality of users U1 to U6, the grade of each user is determined from 1 to 6. The grade of each user may be determined by the user determining module 120. For example, by the user determining module 120, the grade of the user U1 may be determined as 6, and the grade of the user U2 may be determined as 4. In addition, by the user determining module 120, the grade of the user U3 may be determined as 1, and the grade of the user U4 may be determined as 5. In this way, the user determining module 120 may determine the grade for all of six users. Only 6 users are shown in FIGS. 4 and 5 for convenience of explanation, but there may be many users using batteries. In this case, the user determining module 120 may determine a user grade for each of the plurality of users. For example, when there are 3,000 users, the user determining module 120 may determine a user grade for each of the 3,000 users.

As shown in FIG. 5, the user determining module 120 may determine different grades for a plurality of users. However, the user determining module 120 may determine the same grades for at least some of the plurality of users.

When the grade of each user is determined, the user determining module 120 may store the determined result in an internal memory included therein or a separate storage module or server provided externally.

The selecting module 130 may be configured to select a suitable battery for a user who requests to use a battery, namely a requester. Here, the requester is a subject who wants to receive and use a battery, and, for example, the requester may be a driver of an electric vehicle. That is, the driver of the electric vehicle may request to use a battery to the battery distributing apparatus according to the present disclosure, when the driver wants to replace and use the battery for his/her vehicle. In this case, the driver of the electric vehicle may be the requester.

The requester, namely the subject who wants to use the battery, may be a user whose grade is determined by the user determining module 120. For example, in the former embodiments of FIGS. 4 and 5, the requester may be at least one of the users U1 to U6 who have used the battery in the past.

In addition, the selecting module 130 may be configured to select a suitable battery among the plurality of batteries in response to the request to use the battery by the requester. For example, if the user U1 requests to use a battery as a requester, the selecting module 130 may determine a battery suitable for the requester U1.

In particular, the selecting module 130 may be configured to consider a user grade and a battery level in determining a battery suitable for the requester in this way. That is, if the grade of the user is determined by the user determining module 120 and the level of the battery is determined by the battery determining module 110 as described above, this information may be provided to the selecting module 130. In addition, the selecting module 130 may be configured to select a battery suitable for the requester by using this information, namely the grade of the user and the level of the battery.

According to this configuration of the present disclosure, the battery may be efficiently distributed in consideration of the state of the battery and the characteristics of the user. For example, when a request to use a battery is received from a requester in a state where the battery charging station is equipped with a plurality of fully-charged batteries, an optimal battery may be distributed and provided in consideration of the grade of the user and the level of the battery, without supplying the fully-charged batteries at random. Therefore, in this case, the batteries and the users may be effectively managed. In particular, according to the configuration, it is possible to properly distribute batteries with reduced maintenance costs by considering the state of the battery and/or the battery usage characteristics or tendency of the user.

Meanwhile, at least one of the battery determining module 110, the user determining module 120 and the selecting module 130 included in the battery distributing apparatus according to the present disclosure may selectively include a central processing unit (CPU), a graphic processing unit (GPU), an application-specific integrated circuit (ASIC), a chipset, a logic circuit, a register, a communication modem, a data processing unit, a processor, or the like, known in the art to execute various control logics performed in the present disclosure, or may be expressed in their terms. In addition, when the control logic is implemented as software, at least one of the battery determining module 110, the user determining module 120 and the selecting module 130 may be implemented as a set of program modules. In this case, the program module may be stored in a memory and executed by the battery determining module 110, the user determining module 120 and the selecting module 130. The memory may be provided inside or outside the battery determining module 110, the user determining module 120 and the selecting module 130, and may be connected thereto by various well-known means. Meanwhile, in this specification, the expressions such as 'configured to . . . ', 'to perform . . . ', or the like used to explain configuration, function, operation, or the like of each component such as the battery determining module 110, the user determining module 120 and the selecting module 130 may include the meaning of 'programmed to . . . '.

The battery distributing apparatus according to the present disclosure may further include an input module 140 as shown in FIG. 1.

The input module 140 may be configured to allow a user to input predetermined information. Here, the user may include a user who wants to return a used battery or a user (requester) who requests to use a battery.

In addition, the input module 140 may include various user interfaces (UIs) known at the time of filing of this application in order to receive information from the user.

For example, the input module 140 may include a monitor, a touch screen, a keyboard, a mouse, or a button. In addition, when the user accesses, the input module 140 requests the user to input predetermined information using the monitor, and if the user inputs the information through the touch screen or keyboard, the inputted information may be stored therein or provided to another component.

Alternatively, the input module 140 may include a communication unit. In addition, the communication unit may be configured to receive information from the user through a wired or wireless communication network. For example, the input module 140 may be configured to be connectable to a 4G or 5G communication network, so that when the user inputs information through a smartphone, the corresponding information may be input through the communication network.

In particular, the input module 140 may be configured to receive identification information for a user. For example, the input module 140 may receive an ID and a password from the user to receive the identification information for the corresponding user. For example, the input module 140 may receive the user identification information regarding whether the user is U1 or U2. As another example, when the input information of the user is transmitted through a smartphone, the input module 140 may receive the identification information of the user by means of an identification code of the user transmitted through the communication network. As another example, the input module 140 may include a camera and receive identification information for a user by recognizing a user identification QR code (Quick Response code). In addition, the input module 140 may receive user identification information in various other methods known at the time of filing of this application.

Also, the input module 140 may be configured to receive an input purpose of the user. For example, the input module 140 may be configured to receive information regarding whether the input purpose of the user is to return a battery after completely using the battery or to receive and use a battery by rental, purchase, or replacement of the battery.

The input module 140 may process the information input by the user by itself or provide the information to another component such as the battery determining module 110, the user determining module 120 and the selecting module 130.

In particular, the input module 140 may be configured to distinguish a provision target of the input information according to the input purpose of the user. For example, when the input purpose of the user is to return a battery, the input module 140 may transmit the input user identification information to the user determining module 120. As another example, if the input purpose of the user is to apply for using a battery, the input module 140 may provide the input user identification information to the selecting module 130.

As a more specific example, when the user U1 wants to return a battery, the identification information notifying that the user is U1 may be provided to the user determining module 120. In addition, the user determining module 120 may determine a user grade for the user who returns the battery, namely the returner U1, and store the determined information. Meanwhile, when the user U1 wants to rent a battery, the identification information notifying that the user is U1 may be provided to the selecting module 130. In addition, the selecting module 130 may be configured to select a suitable battery for the user who has requested to use a battery, namely the requester U1.

In particular, in the battery distributing apparatus according to the present disclosure, the battery determining module 110 may be configured to determine the level of the battery based on the SOH (State Of Health) of the battery. That is, if the SOH of the battery is estimated, the battery determining module 110 may be configured to classify the level of the battery according to the estimated SOH.

Here, the battery determining module 110 may be configured to directly estimate the SOH of the battery. Such a method of estimating the SOH of a battery is widely known at the time of filing of this application and thus will not be described in detail here. In addition, in the present disclosure, the battery determining module 110 may be configured to estimate the SOH of each battery using various SOH estimation methods known at the time of filing of this application.

Alternatively, the battery determining module 110 may not directly estimate the SOH of the battery, but may receive information on the estimated SOH value from another component, for example the battery. In particular, recently, a battery pack for an electric vehicles or the like may include a function of estimating the SOH of the corresponding battery pack or a battery cell included therein by a control unit such as a BMS (Battery Management System). In this case, the battery determining module 110 may be configured to receive information on the SOH of the corresponding battery from the BMS of the battery pack or the like.

In addition, the battery determining module 110 may be configured to divide the SOH of the battery into a plurality of sections, so that the level of the battery is different for each section. For example, the battery determining module 110 may divide the SOH of the battery in the range of 0 to 100%, into 10 sections by 10%. That is, the battery determining module 110 may divide the SOH of the battery into 10 sections of 0 to 10%, 11 to 20%, 21 to 30%, . . . , 91 to 100%.

In addition, the battery determining module 110 may assign different levels to the sections divided as described above, respectively. In particular, the battery determining module 110 may be configured such that the level is higher as the SOH is higher. For example, the battery determining module 110 may determine the level of the battery for each SOH section such that Level 1 is endowed to the SOH section of 0 to 10%, Level 2 is endowed to the SOH section of 11 to 20%, Level 3 is endowed to the SOH section of 21 to 30%, . . . , and Level 10 is endowed to the SOH section of 91-100%. That is, the battery determining module 110 may be configured to increase the level by one level whenever the SOH increases by 10%. In this case, it may be regarded that the SOH of the battery is higher as the number indicating the level of the battery is higher. In other words, it may be regarded that the state of the battery is better as the level of the battery is higher. However, such a battery level assignment method is only an example, and the level of the battery may be determined or expressed based on the SOH in various other methods.

According to the embodiment in which the battery determining module 110 determines the level of each battery based on the SOH of the battery as described above, the batteries may be managed more easily. Moreover, in the embodiment in which the SOH of the battery is considered as described above, the batteries may be used and distributed in consideration of the SOH for all of the plurality of batteries. In particular, by suppressing the use of a battery with a low SOH among the plurality of batteries, it is possible to prevent a specific battery from being more degraded compared to other batteries. That is, according to the embodiment, it may be advantageous to adjust the degree of degradation among the plurality of batteries and to equalize the degradation for all of the plurality of batteries. Accordingly, in this case, it is possible to prevent the replacement cycle for the plurality of batteries from being reduced, thereby reducing the battery management cost. Moreover, for the battery charging station that has and manages a plurality of batteries, it is possible to prevent the battery replacement cycle from being shortened by preventing the degradation of a specific battery from being accelerated, while improving the reliability of the business.

The user determining module 120 may determine the grade of a user who has used a battery based on battery use history. That is, the user determining module 120 may be configured to classify and determine the user grade according to the battery use history. Here, the use history may be information about the type or method in which the user has used the battery. In particular, in the case of a battery for an electric vehicle, the use history may include information about a driving history of the electric vehicle. Therefore, it may be regarded that the use history includes information indicating a driving pattern about in which pattern the user has driven the electric vehicle.

According to this configuration of the present disclosure, since the grade of the user is determined according to the battery use history of the user and a battery to be distributed to the user is determined accordingly, a battery appropriate to the characteristics of the user may be distributed. In particular, according to the above configuration, the battery to be distributed may be determined by combining the driving pattern of the user and the state of the battery, for example the SOH of the battery. For example, according to the above embodiment, depending on whether the user frequently accelerates and decelerates while driving the electric vehicle or frequently uses the battery, the grade of the user may be determined, and an appropriate battery may be distributed to the user.

Meanwhile, the user grade determined by the user determining module 120 may be stored together with identification information of each user. For example, if the user who returns a battery is U3 and the grade of the user is determined as Grade 3, the user determining module 120 may store information that the user grade of the user U3 is Grade 3. That is, the user grade may be stored to be matched with each user.

The user determining module 120 may be configured to newly store or update the grade of a user when the corresponding user requests to return the battery. For example, when a return request of the user is input together with the user identification information through the input module 140, the user identification information and the return request may be provided to the user determining module 120. In this case, the user determining module 120 may be configured to check whether the grade information for the corresponding user is already determined. For example, when the input information indicating that the user U1 requests to return a battery is received through the input module 140, the user determining module 120 may check whether the grade determined for the user U1 is stored in its own memory or an external server.

If the grade information for the corresponding user is not previously determined, the user determining module 120 may newly store the grade information determined for the corresponding user. Meanwhile, if the grade information for the corresponding user is previously determined, the user determining module 120 may update the grade information determined for the corresponding user. In particular, the user determining module 120 may be configured to update the user grade information for the corresponding user whenever the user returns a battery.

The battery distributing apparatus according to the present disclosure may further include a battery information collecting module 150 as shown in FIG. 1.

The battery information collecting module 150 may be configured to be connectable to a battery, and may be configured to receive information about the use history from the battery. For example, the battery information collecting module 150 may be connected to the battery through a connection cable, and may receive information on the use history of the corresponding battery from a control unit such as a BMS or a memory provided in the battery.

In addition, the battery information collecting module 150 may be configured to transmit the use history information provided from the battery to the user determining module 120. For example, the battery information collecting module 150 may transmit the information about which shape the corresponding battery has or in which pattern the corresponding battery has been used to the user determining module 120. Then, the user determining module 120 may be configured to determine the user grade for the corresponding user based on the battery use history information provided from the battery information collecting module 150 and the user identification information provided from the input module 140 as described above.

According to this configuration of the present disclosure, the information about the use history of the battery may be collected more easily, and the grade of the user may be determined more easily through the information. In particular, the information on the use history of the battery may be easily figured out directly by the subject in which the battery is installed, for example the electric vehicle, or the battery. In particular, since the battery is directly provided at a charging station or the like, the battery distributing apparatus may easily access the battery. Therefore, it may be easier to collect the use history of the corresponding battery from the battery.

In particular, in the embodiment as described above, when the input module 140 receives a request to return a battery from the user, this request information may be transmitted to the battery information collecting module 150. Then, the battery information collecting module 150 that has received this request information may be configured to operate and collect information about the battery to be returned. That is, the battery information collecting module 150 may be configured to operate when a request to return a battery is received by the input module 140.

The user determining module 120 may be configured to use an instantaneous discharge current of a battery as the battery use history. Here, the instantaneous discharge current may mean the amount of current discharged for a predetermined time, for example 1 second. Information on the instantaneous discharge current may be provided from the battery information collecting module 150 or the like. For example, the battery information collecting module 150 may acquire information about the instantaneous discharge current from a battery that has been requested to be returned. In addition, the acquired information may be transmitted to the user determining module 120. Then, the user determining module 120 may determine a user grade for the corresponding user by using the instantaneous discharge current information provided from the battery information collecting module 150 and the user identification information provided from the input module 140.

In this way, the user determining module 120 may be configured to determine the user grade by using the instantaneous discharge current of the battery. In particular, the user determining module 120 may determine the user grade based on the number of times that the instantaneous discharge current exceeds a certain level or more. For example, the user determining module 120 may be configured to compare a predetermined reference current with the instantaneous discharge current stored in the battery. Here, the predetermined reference current is a criterion value for comparison with the instantaneous discharge current, and may be a criterion for determining overdischarge. In this case, the user determining module 120 may determine the number of times that the instantaneous discharge current is measured to be greater than the criterion current, namely an overdischarge number. Alternatively, the user determining module 120 may determine a time period during which the instantaneous discharge current exceeds the criterion current, namely an overdischarge time. In addition, the user determining module 120 may be configured to determine a user grade through the overdischarge number or the overdischarge time based on the instantaneous discharge current. In particular, the user determining module 120 may be configured such that the user grade is lower as the overdischarge number is higher or the overdischarge time is longer.

Meanwhile, in this specification, a low user grade may be interpreted as a negative meaning for a corresponding user. For example, it may be regarded that a user with a lower grade has a use characteristic or pattern that makes the battery be degraded relatively more. In other words, as the user grade is lower, it may be regarded that the probability of using the battery in harsher conditions is higher. Therefore, if the user has a high overdischarge number or a long overdischarge time, the battery may be degraded more quickly, so the user determining module 120 may determine the user grade to be low. In particular, when the user grade is expressed numerically, the user grade and its numerical value may have opposite tendencies. In other words, as the number is lower, the user grade is higher, and as the number is higher, the user grade is lower. For example, if the user grade is divided into Grade 1 to Grade 10, Grade 1 may be regarded as a higher grade than Grade 10.

When the user U6 has a higher overdischarge number than the user U5, if the user determining module 120 determines that the user U6 has Grade 3, the user U5 may be graded as having Grade 2 higher than Grade 3.

According to this configuration of the present disclosure, the user grade may be determined based on factors that can degrade the battery. Therefore, when a battery is distributed to the corresponding user, a battery suitable for the user may be distributed by considering the degradation potential or the degree of degradation caused by such degradation factors. In particular, according to this embodiment, by distributing a battery in good condition, such as a battery with high SOH, to a user who may bring more degradation of the battery, it is possible to prevent a battery in poor condition, namely a battery that has been degraded more, from being degraded faster. Therefore, in this case, it may be more advantageous in allowing the degree of degradation to be uniform for the plurality of batteries to be distributed. For example, when rapid acceleration is performed frequently in an electric vehicle, the overdischarge number of the battery may be measured a lot, and in this case, the degradation of the battery may be faster. Therefore, by providing a battery with a high SOH to a user who performs such rapid acceleration a lot, it is possible to prevent a specific battery from being further degraded.

The user determining module 120 may be configured to use a SOC (State Of Charge) of a battery as the battery use history. Here, the SOC is a value indicating the state of charge of the battery, and may be expressed as a percentage such as 0% to 100%, but may also be expressed in various other ways. In particular, the information on the SOC of the battery may be information indicating a lowest SOC, namely a lower limit of the SOC during use of the battery. For example, if the lowest measured SOC is 10% while the battery is being used, the user determining module 120 may use the lowest SOC information of 10% as the battery use history. The battery SOC information may be provided from the battery information collecting module 150 or the like, similar to the instantaneous discharge current described above. In particular, the battery information collecting module 150 may acquire the lowest SOC information in the battery use history from a battery requested to be returned. In addition, the SOC information acquired in this way may be transmitted to the user determining module 120. Then, the user determining module 120 may determine the user grade for the corresponding user by using the SOC information of the battery provided from the battery information collecting module 150 and the user identification information provided from the input module 140.

As such, the user determining module 120 may be configured to determine the user grade by using the SOC information of the battery. In particular, the user determining module 120 may determine the use grade of the user to be lower as the lowest SOC is lower, namely as the battery is used to have SOC close to 0%. For example, if the user U2 has used the battery until the SOC reaches 10% and the user U4 has used the battery until the SOC reaches 5%, it may be regarded that the user U4 has used the battery to have a lower SOC than the user U2. Accordingly, the user determining module 120 may determine the grade of the user U4 to be lower than the grade of the user U2. For example, the user determining module 120 may determine the grade of the user U4 as Grade 5, and determine the grade of the user U2 as Grade 4 higher than Grade 5.

According to this configuration of the present disclosure, it may be determined whether the battery may be degraded more for each user from various aspects. That is, according to the configuration, the battery use characteristic of the user may be determined in consideration of the lowest SOC, and a suitable battery may be distributed based thereon. In particular, according to this embodiment, by providing a battery having a slower battery degradation to a user having a use pattern that may more easily degrade a battery, the difference in degradation rate may be reduced for a plurality of batteries.

The user determining module 120 may be configured to use a charging environment of a battery as the battery use history. Here, the charging environment of the battery may mean a charging condition of the battery or a charging specification of the battery. That is, the user determining module 120 may be configured to determine the user grade in consideration of information on under what conditions the battery is charged or under what specification the battery is charged.

Even in this embodiment, the user determining module 120 may receive information about the charging environment of the battery from the battery information collecting module 150. That is, the battery information collecting module 150 may collect information about the charging environment of the battery from the battery, and store the collected information in the user determining module 120. Then, the user determining module 120 may determine the user grade for the corresponding user by combining the charging environment information of the battery provided by the battery information collecting module 150 and the identification information provided from the input module 140 as described above.

In addition to discharging conditions or discharging type, the degree of degradation of the battery may vary depending on the charging environment. In particular, the charging environment for the battery may be different for each user. For example, a charger that charges the battery may be different for each user. Therefore, according to this embodiment, it is possible to distribute and provide a battery suitable for the user by determining the degradation possibility differently according to the charging environment.

Here, the charging environment of the battery may include a charging C-rate of the battery. That is, the user determining module 120 may be configured to determine the user grade in consideration of the charging C-rate when the battery is charged.

In particular, the user determining module 120 may be configured to determine a lower user grade as the charging C-rate is higher. For example, if the user U4 has charged the battery at C-rate 1 and the user U1 has charged the battery at C-rate 3, the user determining module 120 may be configured to set the user grade of the user U4 to be higher than that of the user U1. More specifically, the user determining module 120 may determine the grade of the user U4 as Grade 5 and determine the grade of the user U1 as Grade 6 lower than Grade 5.

Since the charging C-rate in the charging environment may significantly affect the degradation of the battery, according to this embodiment, it may be more effective to distribute a suitable battery in consideration of the battery use environment of the user. In particular, according to this configuration, a battery in a good state with a high SOH may be distributed to a user who charges the battery in a charging environment where the battery can be degraded relatively more. Therefore, in this case, the degree of degradation may be equalized more easily for a plurality of batteries.

In addition, the charging environment of the battery may include a maximum charging SOC of the battery. That is, the user determining module 120 may be configured to determine the user grade by using information on to which SOC the battery is charged when the battery is charged.

In particular, the user determining module 120 may be configured to determine a lower user grade as the maximum charging SOC is higher. For example, if the user U5 charges the battery to SOC 100% and the user U3 charges the battery to SOC 95% when charging the battery, the user determining module 120 may determine the grade of the user U5 to be lower than the grade of the user U3.

A user who charge a battery to a higher SOC may degrade the battery faster. Therefore, according to this embodiment, it is possible to distribute a battery suitable for the user in consideration of such degradation potential factors.

Meanwhile, in the above descriptions, the user grade is expressed using integers, like Grade 1, Grade 2, Grade 3, . . . , but this is only an example, and the present disclosure is not necessarily limited to this form. This will be described in more detail with reference to FIG. 6.

Figure 6:
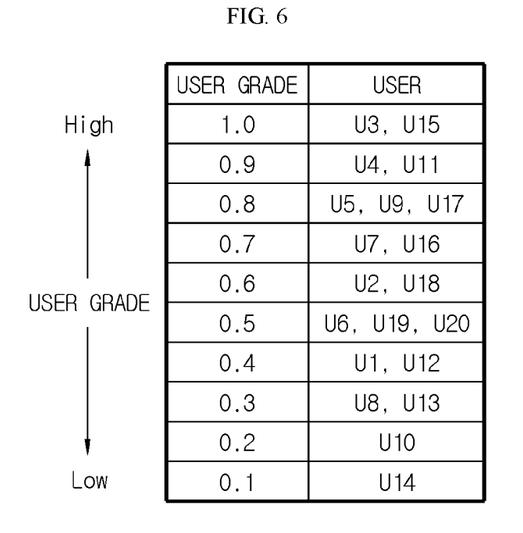
FIG. 6 is a table showing user grades determined by the user determining module according to another embodiment of the present disclosure and an example of users included in each grade.

FIG. 6 is a table showing user grades determined by the user determining module 120 according to another embodiment of the present disclosure and an example of users included in each grade.

Referring to FIG. 6, the user grade is divided into values between 1 and 0, and is expressed to the first decimal place. More specifically, the user grade may be divided to decrease from 1 by 0.1, like 1.0, 0.9, 0.8, 0.7, . . . , 0.1. In addition, it may be regarded that the user grade is higher as being closer to 1.0, and the user grade is lower as being closer to 0.

In FIG. 6, each numerical value may represent a grade. That is, a grade indicated by 1.0 may be Grade 1.0, a grade indicated by 0.9 may be Grade 0.9, and a grade indicated by 0.8 may be Grade 0.8. In addition, such a grade criterion may be stored in advance in an internal memory of the user determining module 120 or an external memory so as to be used by the user determining module 120.

As such, the user determining module 120 may be configured to express the grade of each user as a score between 0 and 1. Moreover, the user determining module 120 may be configured to endow a basic score to each user and determine the user grade by subtracting a certain score from the endowed basic score according to a predetermined factor reflecting the use characteristics of the user.

For example, the user determining module 120 may be configured to give 1 point as a basic score to the user, and subtract a predetermined value according to the instantaneous discharge current, the lowest SOC, the charging C-rate, and the maximum charging SOC described above. In this case, the subtracted value according to the instantaneous discharge current, the lowest SOC, the charging C-rate, and the maximum charging SOC may be respectively expressed as a value between 0 and 1.

More specifically, the user determining module 120 may determine the user grade using Equation 1 below.

$$\text{User grade} = 1 - (a+b+c+d)/4 \quad \text{(Equation 1)}$$

That is, the user determining module 120 may determine the grade of the user who has used a battery by subtracting a value obtained by dividing the sum (a+b+c+d) of four factors reflecting the use characteristic by the number (4) of factors from the basic score (1).

In Equation 1, a is one factor that reflects the battery use characteristics of the user, and may represent the ratio of the instantaneous overdischarge number to total discharging number. For example, for a user of a battery in which the total discharging number is recorded as 10 times and the instantaneous overdischarge number is recorded as 7 times, the user determining module 120 may determine that a is 7/10, namely 0.7.

In addition, in Equation 1, b is another one factor that reflects the battery use characteristics of the user, which is a value indicating the lowest SOC during discharging, and may be expressed as a value between 0 and 1 according to the section of the lowest SOC. For example, it may be determined that b=1 when the lowest SOC is 0%, and b=0 when the lowest SOC is 20% or more. In addition, when the lowest SOC is greater than 0% or less than 20%, b may be determined as a value between 0 and 1. For example, for a user who uses a battery until the lowest SOC reaches 10%, the user determining module 120 may determine that b is 0.5.

In addition, in Equation 1, c is another one factor that reflects the battery use characteristics of the user, which is a value representing the charging C-rate, and may be expressed as a value between 0 and 1 depending on the magnitude of the charging C-rate. For example, c may be determined as 1 when the charging C-rate is 3 or more, and c may be determined as 0 when the charging C-rate is 0.5 or less. In addition, when the charging C-rate is between 1 and 3, c may be determined as a value between 0 and 1. In particular, c may be determined as a ratio to the maximum charging C-rate. For example, for a user who charges a battery such that the charging C-rate corresponds to 30% of the maximum C-rate, the user determining module 120 may determine that c is 0.3.

In addition, in Equation 1, d is another one factor that reflects the battery use characteristics of the user, which is a value representing the maximum charging SOC of the battery, and may be expressed as a value between 0 and 1 depending on the degree of maximum charging of the battery. For example, d may be 0 when the maximum charging SOC is 80% or less, and d may be 1 when the maximum charging SOC is 100%. In addition, when the maximum charging SOC is between 80% and 100%, the d value may be configured to increase according to a certain ratio as the maximum charging SOC increases. For example, for a user who has charged the battery until the maximum charging SOC reaches 95%, the user determining module 120 may determine that d is 0.75.

In addition, when a, b, c, and d determined in this way are put into Equation 1, it may be calculated as follows.

User grade=1−(0.7+0.5+0.3+0.75)/4=0.4375

In addition, the user determining module 120 may determine a grade corresponding to a numerical value closest to the calculated value as the user grade. For example, when the user grade for the user U1 is calculated as 0.4375, since it is close to 0.4, the user determining module 120 may determine that the user grade of the user U1 is 0.4.

In addition, in FIG. 6, the grades for the remaining 19 users whose user grades are determined in this way are shown. That is, the user determining module 120 may determine the user grade in the same manner as above for a total of 20 users U1 to U20 as users who have used batteries, and store the user identification information corresponding to each grade in the internal memory or the like.

According to this configuration of the present disclosure, the user grade may be easily calculated and determined in a simple manner. Moreover, when the user grade is calculated in this way, the level of the battery to be distributed may be determined more easily.

In particular, like the user grade, the battery level may also be configured to be classified as a value between 1 and 0. That is, the battery determining module 110 may be configured to divide the level as a value between 1 and 0 for the battery. This will be described in more detail with reference to FIG. 7.

Figure 7:
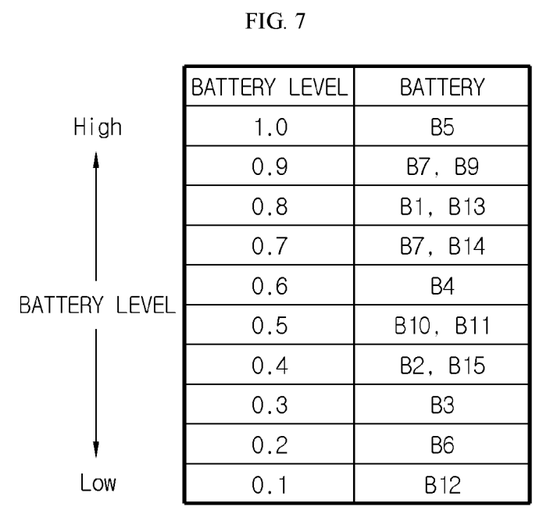
FIG. 7 is a table showing battery levels determined by the battery determining module according to another embodiment of the present disclosure and an example of batteries included in each level.

FIG. 7 is a table showing battery levels determined by the battery determining module 110 according to another embodiment of the present disclosure and an example of batteries included in each level.

Referring to FIG. 7, the battery level is divided as a value between 1 and 0, and is expressed to the first decimal place. In particular, the battery level may be divided to decrease from 1 by 0.1, like 1.0, 0.9, 0.8, 0.7, . . . , 0.1. In addition, the battery level is higher as being closer to 1.0, the battery level is lower as being closer to 0.

Also in FIG. 7, each numerical value may indicate a battery level. That is, the battery level indicated by 0.7 may be expressed as Level 0.7, and the battery level indicated by 0.4 may be expressed as Level 0.4. Such a level criterion may be stored in advance in an internal memory of the battery determining module 110 or an external memory so as to be used by the battery determining module 110.

In particular, when the battery level is expressed as a value between 0 and 1 as in this embodiment, the level of the battery may indicate the SOH of the battery. That is, the SOH of the battery may be expressed as a percentage or may be expressed as a value between 0 and 1. For example, when the SOH of the battery is 80% as a percentage, it may be expressed as 0.8 as a value between 0 and 1. Therefore, in this configuration, it may be regarded that the SOH of the battery expressed as a value between 0 and 1 indicates the level of the battery. For example, if the SOH of the battery B1 is 0.8, the level of the battery B1 may also be Level 0.8.

In addition, in FIG. 7, the levels for the remaining 14 batteries whose battery levels are determined in this way are shown. That is, the battery determining module 110 may determine the battery level in the same way as above for 15 batteries B1 to B15 equipped in the charging station or the like and store the corresponding battery in the internal memory or the like for each level.

According to this configuration of the present disclosure, there is no need to prepare a separate criterion to indicate the level of the battery. Accordingly, the level of the battery may be determined in a simpler way. In addition, in this case, as described later, a battery may be selected by the selecting module 130 more simply.

As described above, the selecting module 130 may select a battery suitable for a user who has requested to use a battery, namely the requester, by matching the grade information for each user determined by the user determining module 120 and the level information for each battery determined by the battery determining module 110 with each other.

In particular, the selecting module 130 may select a battery to be distributed by using Equation 2 below.

Battery level=(1−user grade)  (Equation 2)

Here, the user grade may be displayed as a value between 0 and 1 as described above in the embodiment of FIG. 6. In addition, the battery level may be displayed as a value between 0 and 1 as described above in the embodiment of FIG. 7.

That is, the selecting module 130 may calculate the battery level by subtracting the value corresponding to the user grade from the basic score of 1. In addition, the selecting module 130 may provide a battery corresponding to the calculated battery level to the corresponding user.

For example, when the user U7 requests to use a battery as a requester through the input module 140, such a request signal may be provided from the input module 140 to the selecting module 130. Then, as shown in FIG. 6, the selecting module 130 may check the grade of the user U7, who is the requester, from the grade data of each user determined by the user determining module 120. In FIG. 6, the grade of the user U7 is 0.7. In addition, by putting the user grade of 0.7 into Equation 2, a value of 0.3 may be obtained. Accordingly, the selecting module 130 may identify a battery corresponding to Level 0.3 from the level data of each battery determined by the battery determining module 110 as shown in FIG. 7. In FIG. 6, since the battery corresponding to Level 0.3 is B3, the selecting module 130 may select the battery B3 as a battery to be distributed to the requester U7. Therefore, the requester U7 may be provided with the battery B3.

As another example, when the user U10 requests to use a battery as a requester, the selecting module 130 may check that the grade of the user U10 is 0.2 based on the user grade data of FIG. 6. In addition, the selecting module 130 may calculate the level of the battery to be distributed to the user U10 as 0.8 by using Equation 2. In FIGS. 7, B1 and B13 exist as batteries of Level 0.8. Accordingly, the selecting module 130 may determine to distribute one of the batteries B1 and B13 to the requester U10. In this case, the requester U10 may be provided with the battery B1 or the battery B13.

In addition, the selecting module 130 may be configured to select a suitable battery in consideration of a battery use request time point of the requester. In particular, the selecting module 130 may be configured to have different battery selection criteria for at least two time zones after dividing 24 hours a day into a plurality of time zones.

Moreover, the selecting module 130 may be configured to determine the level of the battery to be distributed by using Equation 3 below.

Battery level=(1−user grade)×(weight per time zone)   (Equation 3)

Equation 3 may be regarded as being different from Equation 2 above in that a 'weight per time zone' is multiplied. The 'weight per time zone' is a value predetermined for each time zone, and may be set as 1 or a value higher or lower than 1. In particular, the 'weight per time zone' may be a value between 0 and 2.

The 'weight per time zone' may be preset and stored by the selecting module 130, and in the case of a time zone where the battery may be degraded relatively frequently, it may be set as a value greater than 1. For example, when the use of the battery is requested in a time zone where the battery may be charged and discharged frequently, a time zone where the battery can may be over discharged frequently, or a time zone where the battery may be used under high temperature or low temperature conditions, the selecting module 130 may set the weight per time zone as a value higher than 1. Moreover, as the battery may be degraded more severely, the weight per time zone may be set to be further greater than 1.

Meanwhile, in a time zone where the battery may be degraded relatively little, it may be set as a value smaller than 1. For example, when the use of the battery is requested in a time zone where the battery may be charged and discharged relatively little, in a time zone where the battery can is hardly over discharged, or in a time zone where the battery may be used under optimum temperature conditions, the selecting module 130 may set the weight per time zone as a value lower than 1. Moreover, as the battery may be degraded more weakly, the weight per time zone may be set to be further smaller than 1.

In addition, in a time zone where the battery may be degraded at an average level, for example in a time zone where the battery may be used on average, the selecting module 130 may set the weight per time zone as 1.

Figure 8:
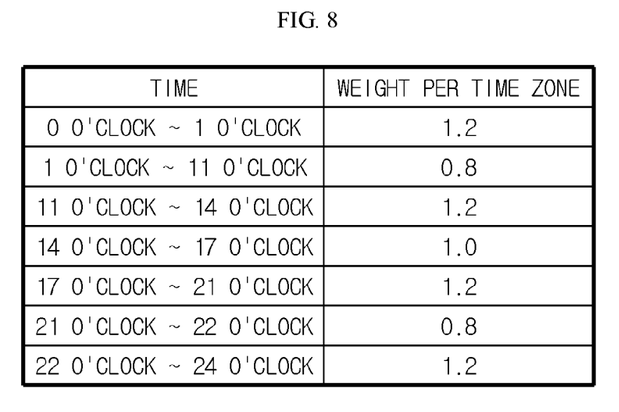
FIG. 8 is a table showing an example of a weight per time zone that is considered by a selecting module according to an embodiment of the present disclosure.

FIG. 8 is a table showing an example of a weight per time zone that is considered by the selecting module 130 according to an embodiment of the present disclosure.

Referring to FIG. 8, the time from 0 o'clock to 24 o'clock of one day is divided into a total of 7 time zones. Among them, for the time zones from 0 o'clock to 1 o'clock, from 11 o'clock to 14 o'clock, from 17 o'clock to 21 o'clock, and from 22 o'clock to 24 o'clock, the weight per time zone is set as 1.2, which is a value greater than 1. In addition, for the time zone from 14 o'clock to 17 o'clock, the weight per time zone is set as 1.0. In addition, for the remaining time zones of from 1 o'clock to 11 o'clock and from 21 o'clock to 22 o'clock, the weight per time zone is set a 0.8, which is a value smaller than 1.

In this embodiment, when the user U7 requests to use a battery as a requester, the selecting module 130 may check that the user grade of the user U7 is 0.7, based on the former embodiment of FIG. 6. In addition, the selecting module 130 may check a time point when the requester has requested to use the battery.

If the battery use request time point is 12 o'clock, the selecting module 130 may check that the weight per time zone is 1.2 in the embodiment of FIG. 8. In addition, by putting the user grade and the weight per time zone checked as above into Equation 3 above, the selecting module 130 may calculate the battery level as follows.

Battery level=(1−0.7)×(1.2)=0.36

In addition, with respect to the calculated battery level of 0.36, the selecting module 130 may be configured to adopt a closest battery level in the table of FIG. 7. That is, since 0.36 is close to 0.4, the selecting module 130 may determine a battery having a battery level of 0.4, for example the battery B2 or the battery B15 in FIG. 7 as a battery to be distributed to the user U7.

Meanwhile, when the battery use request time point by the user U7 is 8 o'clock, the selecting module 130 may check the weight per time zone as 0.8 in the embodiment of FIG. 8. In addition, as in the previous description, using Equation 3, the selecting module 130 may calculate the battery level as follows.

Battery level=(1−0.7)×(0.8)=0.24

In addition, since 0.24 is closest to 0.2 in the table of FIG. 7, the selecting module 130 may determine to distribute a battery having a battery level of 0.2, namely the battery B6, to the requester U7.

According to this configuration of the present disclosure, it is possible to predict a battery use situation in advance and distribute a battery suitable therefor. That is, even though a request is received from the same user, different batteries may be provided depending on whether the battery is used a lot and thus may be degraded easily or the battery is not used a lot and thus may not be degraded easily. In particular, in the case of a shared exchange-type battery widely used in the delivery industry or the like, meal time zones, for example lunch time, dinner time and late night meal time, may be regarded as peak time zones for the use of a battery. A battery for which a use request is made in such a peak time zone is likely to be used more than in other time zones and is likely to have more instantaneous discharge currents for the battery. Therefore, a battery used in such a peak time zone may be regarded as being more exposed to degradation conditions. Therefore, according to this embodiment, it is possible to provide a battery with relatively less degradation, namely a battery with high SOH, as a battery distributed in a peak time zone in which the battery may be used a lot. In this case, the degradation of the battery may be made more uniform by considering the future situation in which the battery will be used.

Meanwhile, in FIG. 8, weights are divided into three types (0.8, 1.0, 1.2) for each time zone, but weights may also be divided into two types, or four or more types.

In addition, the selecting module 130 may be configured to select a suitable battery in consideration of temperature.

For example, the selecting module 130 may select a battery in consideration of the temperature when a request to use a battery is made. In this case, the weight per time zone of Equation 3 may be replaced with a weight per temperature.

In particular, if the battery is used in a situation beyond a predetermined temperature range, the battery may be degraded faster. Therefore, in a temperature environment exceeding the predetermined temperature condition range, the weight per temperature may be greater than 1, for example 1.3. Meanwhile, in an environment within the predetermined temperature condition range, the weight per temperature may be 1.

According to this configuration of the present disclosure, the uniformity of degradation may be further improved for a plurality of batteries in consideration of the temperature condition at the time when the battery is used.

The battery distributing apparatus according to the present disclosure may be applied to a battery charging system. That is, the battery charging system according to the present disclosure may include the battery distributing apparatus. The battery charging system may be applied to a battery charging station, an electric vehicle sales or rental station, a battery sales or rental station, and the like. The battery charging system may further include, in addition to the battery distributing apparatus, other various components, such as a plurality of batteries to be provided, a charging device capable of charging a battery, and the like. In addition, the battery charging system according to the present disclosure may further include various components equipped in a battery charging station known at the time of filing of this application.

Meanwhile, in this specification, the term 'module' is used to refer to a specific component, such as the 'battery determining module', the 'user determining module' and the 'selecting module'. These components represent logical structural units and does not necessarily represent a component that can be or must be physically separated. For example, all or a part of specific components among these components may be integrated with each other or exist separately from each other. For example, at least a part of the 'user determining module' and at least a part of the 'selecting module' may be implemented by one processor.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

110: battery determining module
120: user determining module
130: selecting module
140: input module
150: battery information collecting module

What is claimed is:

1. A battery distributing apparatus, comprising:
a battery determining module configured to determine a level of each battery among a plurality of batteries;
a user determining module configured to determine a grade of each user who uses at least one battery among the plurality of batteries; and
a selecting module configured to select a battery suitable for the user who requests to use the at least one battery among the plurality of batteries, based on the grade of the user determined by the user determining module and the level of the battery determined by the battery determining module,
wherein the battery determining module is configured to determine the level of each battery based on a state of health (SOH) of each battery, and
wherein the level of each battery based on the SOH is determined by dividing the SOH of each battery into a plurality of sections so that the level of the battery is different for each section of the plurality of sections.

2. The battery distributing apparatus according to claim 1, wherein the user determining module is configured to determine the grade of each user based on a battery use history.

3. The battery distributing apparatus according to claim 2, further comprising:
a battery information collecting module configured to receive information about the battery use history of each user from the at least one battery and transmit the received information to the user determining module.

4. The battery distributing apparatus according to claim 2, wherein the user determining module is configured to use an instantaneous discharge current of each battery as the battery use history.

5. The battery distributing apparatus according to claim 2, wherein the user determining module is configured to use a lowest SOC of each battery as the battery use history.

6. The battery distributing apparatus according to claim 2, wherein the user determining module is configured to use a charging environment of each battery as the battery use history.

7. The battery distributing apparatus according to claim 6, wherein the charging environment of each battery includes a charging C-rate of the battery.

8. The battery distributing apparatus according to claim 6, wherein the charging environment of each battery includes a maximum charging SOC of the battery.

9. The battery distributing apparatus according to claim 1, wherein the selecting module is configured to select a suitable battery among the plurality of batteries in consideration of a battery use request time point of the user requesting to use the at least one battery.

10. A battery charging system, comprising the battery distributing apparatus according to claim 1.

11. The battery distributing apparatus according to claim 1, wherein the plurality of sections includes sections at 10% SOC intervals.

12. The battery distributing apparatus according to claim 11, wherein the battery determining module is configured to increase the level of a respective battery by one level when the SOH of the respective battery increases by 10%.

13. The battery distributing apparatus according to claim 1, wherein a first battery with a SOC in a section of the plurality of sections with a higher SOC than a SOC of the second battery has a higher level than the second battery.

14. The battery distributing apparatus according to claim 1, wherein the user determining module is configured to determine the grade of each user based on a driving history or driving pattern of the user.

* * * * *